United States Patent
Thiel et al.

(10) Patent No.: US 8,336,962 B2
(45) Date of Patent: Dec. 25, 2012

(54) ECCENTRIC JOINT FITTING FOR A VEHICLE SEAT

(75) Inventors: Thomas Thiel, Solingen (DE);
Reinhard Vogel, Erkrath (DE);
Burckhard Becker, Solingen (DE);
Wilfried Beneker, Leichlingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 13/025,071

(22) Filed: Feb. 10, 2011

(65) Prior Publication Data

US 2011/0156463 A1    Jun. 30, 2011

Related U.S. Application Data

(63) Continuation of application No. PCT/EP2009/059169, filed on Jul. 16, 2009.

(30) Foreign Application Priority Data

Aug. 13, 2008    (DE) .......................... 10 2008 041 246

(51) Int. Cl.
*B60N 2/02* (2006.01)
(52) U.S. Cl. .................. 297/362; 297/354.12; 297/361.1
(58) Field of Classification Search ............... 297/354.1, 297/354.12, 361.1, 362, 366, 367 R
See application file for complete search history.

(56) References Cited

U.S. PATENT DOCUMENTS

| 6,619,743 B1 * | 9/2003 | Scholz et al. ................. 297/362 |
| 7,188,903 B2 * | 3/2007 | Finner et al. .................. 297/362 |
| 7,278,689 B2 * | 10/2007 | Guillouet ...................... 297/362 |
| 7,285,067 B2 * | 10/2007 | Krambeck et al. ............ 475/162 |
| 7,314,250 B1 | 1/2008 | Eblenkamp |
| 7,513,573 B2 * | 4/2009 | Wahls et al. .................. 297/362 |
| 2005/0110322 A1 * | 5/2005 | Cha ............................... 297/362 |
| 2006/0290188 A1 * | 12/2006 | Guillouet ...................... 297/367 |

FOREIGN PATENT DOCUMENTS

| DE | 19 517 441 | 2/1996 |
| DE | 19 938 666 | 2/2001 |
| DE | 10 2004 007043 | 6/2005 |
| DE | 10 2005 007 045 | 9/2005 |

* cited by examiner

*Primary Examiner* — Peter Brown
*Assistant Examiner* — Philip Gabler
(74) *Attorney, Agent, or Firm* — McCarter & English, LLP

(57) ABSTRACT

A wobble joint fitting for a vehicle seat has a first joint arm, which carries an internal gear and forms a first bearing surface, which are central to a main axis, and a second joint arm to which an eccentric gear is allocated, which comprises an externally toothed pinion and a second bearing surface. The pinion and the second bearing surface are central to an eccentric axis. An eccentric driving part is disposed in the area between the first bearing surface and the second bearing surface. Clamping parts, in a clamping state, displace the eccentric axis relative to the main axis. The eccentric driving part defines the eccentric. The rotary drive of the eccentric driving part causes a rotation of the pinion relative to the internal gear even without the clamping parts being present, wherein only play compensation is not obtained without the presence of the clamping parts.

9 Claims, 6 Drawing Sheets

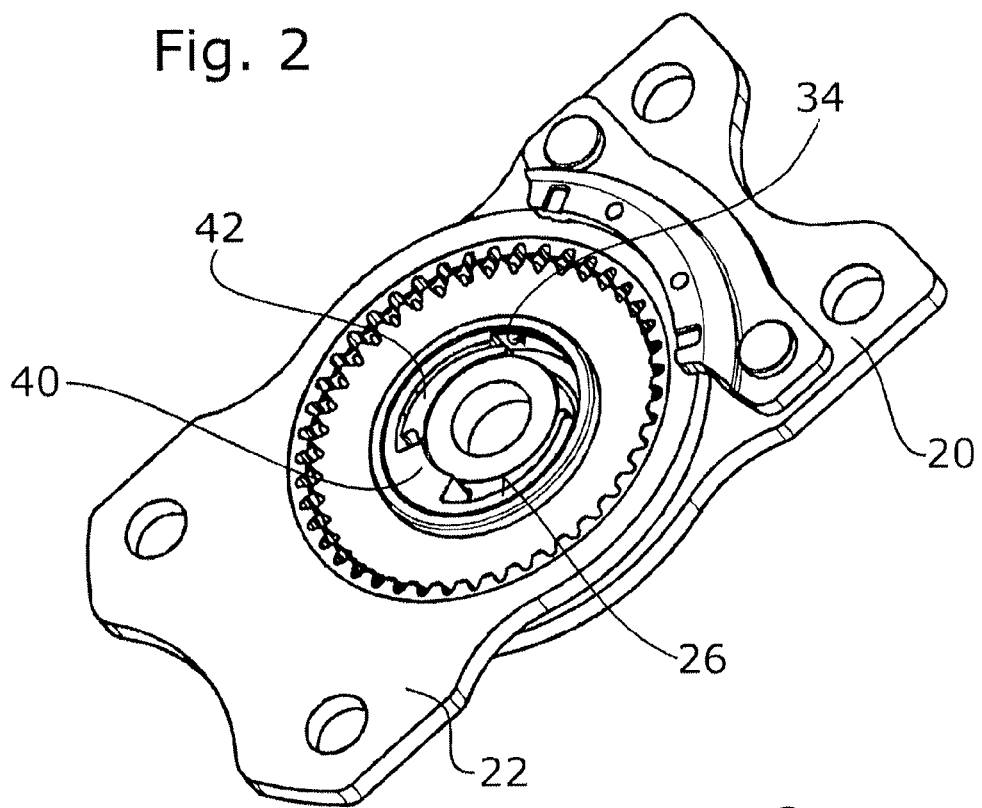
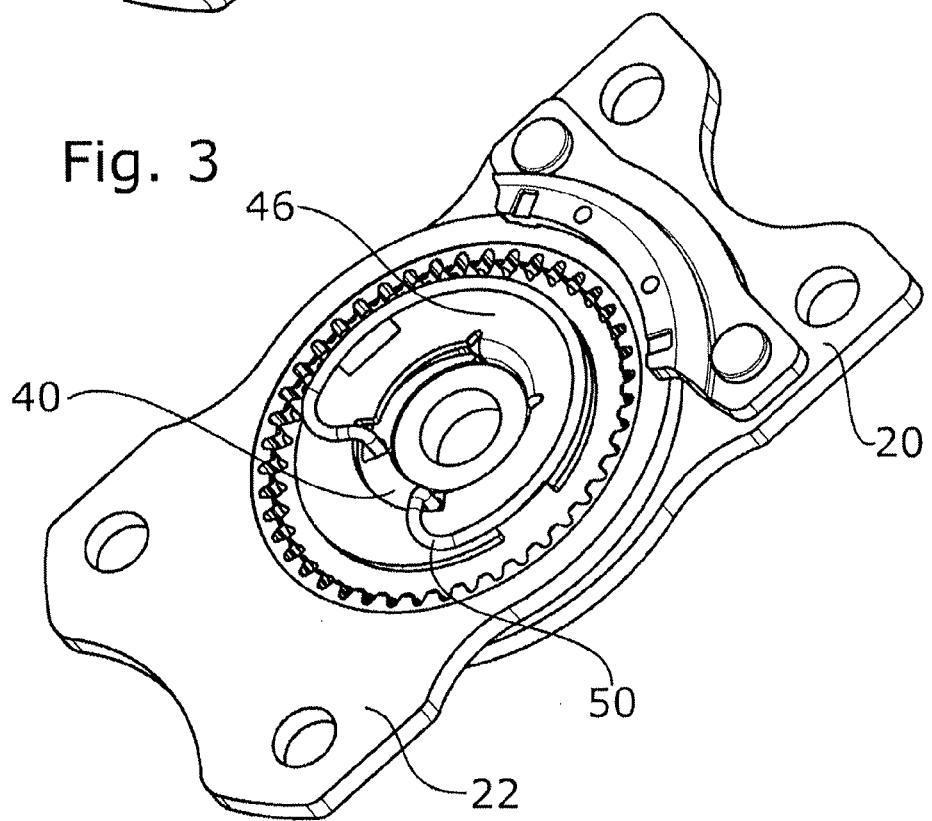

ously incorporated by reference in its entirety as part of the present invention.

ECCENTRIC JOINT FITTING FOR A VEHICLE SEAT

CROSS REFERENCE TO RELATED APPLICATIONS

This application is a continuation of International Application No. PCT/EP2009/059169, filed Jul. 16, 2009 and claims priority to German Application No. 10 2008 041 246 filed Aug. 13, 2008, the contents of both of which are hereby incorporated by reference in its entirety as part of the present invention.

BACKGROUND OF THE INVENTION

Wobble joint fittings, also referred to as gear joint fittings, are disclosed in DE 10 2004 007 043 B3. In this known wobble joint fitting, the clamping parts, which are configured as wedge segments, are located within the eccentric driving part, more specifically between the eccentric driving part and the first bearing surface. The wedge segments are part of the eccentric; together with the eccentric driving part, they define the eccentric. The eccentric driving part is configured as a complete ring.

With regard to the prior art, reference is made to DE 19 938 666 A1, DE 19 517 441 C1 and DE 10 2005 007 045 B3. The second joint arm can be rigidly connected to the eccentric gear; however, another wobble gear can be located between the second joint arm and the eccentric gear, so that the wobbling movement is imperceptible on the outside on the driving hand wheel or the motor.

The wobble joint fitting of the type mentioned in the introduction is disadvantageous in that the clamping parts need to be configured as wedge members or wedge segments, and particularly in that they define the eccentric. Thus, limits are set both with regard to the geometric configuration of the clamping parts as well as their arrangement within the wobble joint fitting. The wedge segments in the wobble joint fitting of the type mentioned in the introduction have a dual function; they are both the means effecting play compensation as well as the means defining the eccentric. Thus, their position within the fitting also determines the location where the eccentrically acting forces actually act in a drive.

SUMMARY OF THE INVENTION

The present invention's aim is to free the clamping parts from their dual function and use them exclusively for compensating play. It is therefore the object of the invention to further develop the wobble joint fitting of the type mentioned in the introduction in such a way that the clamping parts are responsible only for the clamping function, and not for the eccentric function.

In one aspect, the invention relates to a wobble joint fitting for a vehicle seat with a first joint arm, which a) carries an internal gear and b) forms a first bearing surface, the internal gear and the first bearing surface being central to a main axis, with a second joint arm to which an eccentric gear is allocated, which a) comprises an externally toothed pinion that is located within the internal gear and is in engagement therewith, and b) comprises a second bearing surface, the pinion and the second bearing surface being central to an eccentric axis, with an eccentric driving part disposed in the area between the first bearing surface and the second bearing surface, and with clamping parts which, in a clamping state, displace the eccentric axis relative to the main axis, whereby the wobble joint fitting is made as free from play as possible.

Additionally, the invention is directed to a wobble joint fitting for adjusting a vehicle seat. The wobble joint fitting comprises a main axis; a first joint arm, the joint arm a) carries an internal gear and b) forms a first bearing surface, the internal gear and the first bearing surface are arranged central to the main axis; an eccentric gear defining an eccentric axis; a second joint arm, the eccentric gear being allocated to the second joint arm, the second joint arm a) comprises an externally toothed pinion located within the internal gear and in engagement with the internal gear, and b) comprises a second bearing surface, wherein the pinion and the second bearing surface are central to the eccentric axis; an eccentric driving part disposed in the area between the first bearing surface and the second bearing surface and clamping parts displacing, in a clamping state, the eccentric axis relative to the main axis whereby the wobble joint fitting is made free from backlash; wherein the eccentric driving part defines the eccentric and comprises an eccentric area contacting the first bearing surface and the second bearing surface with a fabrication-related play, and a rotary drive of the eccentric driving part, the rotary drive rotating the pinion relative to the internal gear, the rotary drive even being in a driving connection with the pinion in case the clamping parts are not present in the wobble joint fitting, whereby in the case the clamping parts are not present in the wobble joint fitting there is no compensation of backlash.

With this wobble joint fitting, the eccentric is solely defined through the eccentric driving part; the eccentric is not defined by the clamping parts. If the clamping parts are tken out of the fitting according to the invention, the thus modified fitting will properly function and operate, however, in this case the play compensation is lost. No play compensation means the fitting is no longer backlash-free.

The design according to the invention is advantageous in that the clamping parts can be disposed at their optimum position within the joint fitting. They can be optimally designed for a clamping function. They need not be configured as wedges; they can also be configured as rollers, balls, clamping stilts, eccentric parts. Their shape is not determined by the crescent-shaped area between the eccentric driving part and either the first bearing surface or the second bearing surface, as in the prior art; rather, the clamping parts can also be supported on non-round parts. This particularly applies to the geometric configuration of the support of the clamping parts on the eccentric driving part. The clamping parts are now designed exclusively for the clamping function. No attention need be paid to the eccentric function in their design.

The clamping parts preferably cooperate with the first bearing surface. The latter forms a support surface for the clamping parts. In this case, the other support surface of the clamping parts, which lies further outward, is formed on the eccentric driving part and does not inevitably have to be round; it may have any form within broad limits. More favorable clamping conditions are thus obtained. Alternatively, the clamping parts can also cooperate with the second bearing surface. In this case, the other support surface of the clamping parts, which lies further inward, is formed on the eccentric driving part and also does not inevitably have to be round; it may have any form within broad limits.

Another advantage lies in the following: the formation of the eccentric drive by the eccentric driving part is now more favorable. The invention enables a separation of the functions of the play compensation and the drive. The drive now is independent from the clamping parts. It can now be positioned at the optimum angular position relative to an eccentric vector.

An eccentric vector is defined by a foot point lying on the main axis, a tip pointing towards the eccentric axis and a direction perpendicular to the main axis. In a preferred embodiment, an eccentric area is provided which extends at an angle range of ±30°, preferably ±45° and in particular ±60° to the eccentric vector. The eccentric area is in contact with the first bearing surface or the second bearing surface.

The clamping parts can be disposed at an angular distance to the eccentric vector that is substantially greater than that in the prior art. The angular distance is selected such that their supporting function is optimized with regard to play compensation.

Preferably, the clamping parts are allocated to the eccentric driving part. In this way, the clamping parts inevitably join in the movement of the eccentric driving part. The first bearing surface and/or the second bearing surface can be configured cylindrically. Special guidance areas or supporting flanks for the clamping parts are provided in the eccentric driving part.

Where clamping parts are mentioned, reference must be made in particular to the supporting areas of the clamping parts on the first bearing surface or the second bearing surface on the one hand, and on the eccentric driving part on the other hand. The clamping parts themselves can be shaped differently, for example wedge-shaped. They can extend over a relatively large angle range, for example of up to 90°. The deciding factor is where they actually are in contact with the first bearing surface or the second bearing surface on the one hand, and with the eccentric driving part on the other hand. The position of these contact points means the place of actual support. It is this actual support which may be positioned in any way. The support is such that it is designed optimally for play compensation when absorbing large forces. The shape of the clamping parts outside the contact points can be adapted to the respective requirements. Among other things, that concerns the control of the clamping parts between a clamping state and a neutral state.

The wobble joint fitting according to the invention is advantageous in the case of absorbing large forces caused by an accident. In such a case of high load, an immediate flat contact and abutment of the first bearing surface, the eccentric driving part and the second bearing surface occurs. The clamping parts virtually do not play any role in this case.

These and other advantages of the present invention, and/or of the currently preferred embodiments thereof, will become more readily apparent in view of the following detailed description of currently preferred embodiments and the accompanying drawings.

BRIEF DESCRIPTION OF THE DRAWINGS

FIG. 2 shows a perspective view from the front, in FIG. 1 from the right, onto the assembled wobble joint fitting, but without a control part and without a drive, FIG. 3 shows a perspective view as in FIG. 2, but now with a control part; moreover, a spring has been added.

DETAILED DESCRIPTION

Figure 1:
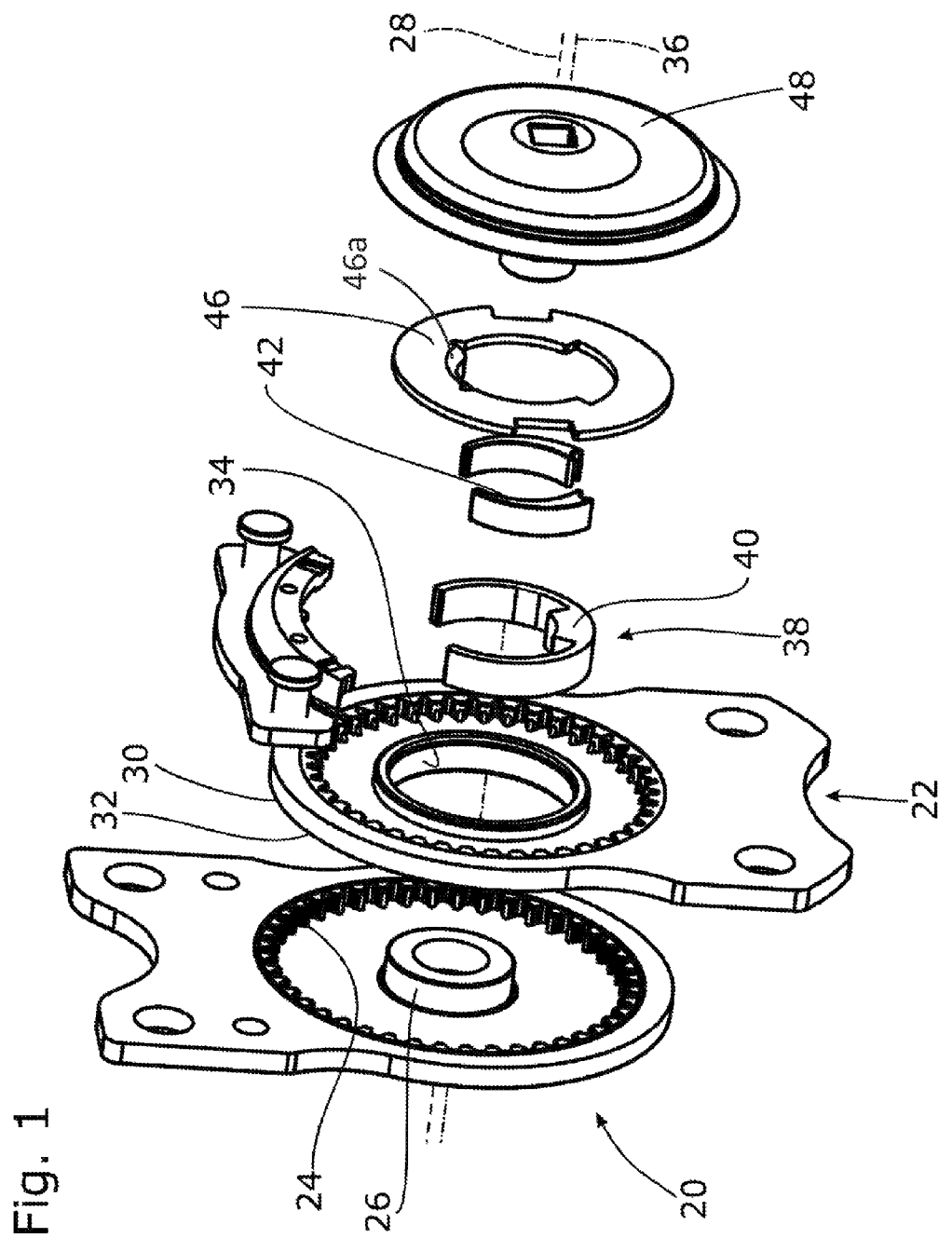
FIG. 1 shows a perspective view in the form of an assembly illustration of a first embodiment of the wobble joint fitting, but without a spring.

The first exemplary embodiment according to FIGS. 1 to 3 is explained and discussed below, the other exemplary embodiments are discussed thereafter; in the process, their differences to the first exemplary embodiment will mainly be dealt with. If there are agreements with the first exemplary embodiment, this will not be discussed in any particular manner. The features of all dependent claims including the partial features, can be combined in any way with each other and preferably also with the main claim.

The wobble joint fitting has a first joint arm 20 and a second joint arm 22 cooperating therewith. The first joint arm 20 comprises an internal gear 24 and a first annular bearing surface 26. The internal gear 24 and the first bearing surface 26 are central to a main axis 28. An eccentric gear 30 is allocated to the second joint arm 22. Allocation in this case means that the eccentric gear 30 is either rigidly connected to the second joint arm 22 or is linked to the second joint arm 22 through a wobble gear similar to the wobble gear shown. The eccentric gear 30 comprises an externally toothed pinion 32 which is in engagement with the internal gear 24 and which can revolve therein in a wobbling manner. Furthermore, the eccentric gear 30 comprises a second bearing surface 34 which is also cylindrical.

In contrast to the first bearing surface 26, which is an outer surface, the second bearing surface 34 is an inner surface. The eccentric gear 30, and thus its pinion 32 and the second bearing surface 34 are central to an eccentric axis 36. Moreover, the wobble joint fitting comprises an eccentric driving part 38 which is located in a crescent-shaped annular gap between the second bearing surface 34 and the first bearing surface 26. This eccentric driving part 38 comprises an eccentric area 40 which is responsible for the actual eccentric function. It rests against both the first bearing surface 26 as well as the second bearing surface 34. The remaining area of the eccentric driving part 38, that is, outside the eccentric area 40, can rest against one of the bearing surfaces 26 or 34, but, as a rule, does not rest against both bearing surfaces 26, 34. It is not responsible for the actual driving function.

Finally, the wobble joint fitting comprises clamping parts 42. In this case, one clamping part is sufficient; for reasons of symmetry, two clamping parts are most frequently provided, as is shown. It is the task of the clamping parts to displace in a clamping state the eccentric axis 36 relative to the main axis 28 in such a way that the wobble joint fitting is as free from play as possible. Before the wobble joint fitting can be adjusted, that is, the first joint arm 20 can be pivoted relative to the second joint arm 22 about the main axis 28, the clamping state of the clamping parts 42 has to be lifted; this applies to at least one of the clamping parts 42. Such a process is state of the art.

According to the invention, the eccentric driving part 38 defines the eccentric. The clamping parts 42 do not belong to the eccentric. The wobble joint fitting works without clamping parts 42; however, the above-described clamping state does not exist, the wobble joint fitting is therefore not free from play. The sole purpose of the clamping parts 42 is to maintain the clamping state in a controlled manner. They do not have any part in the eccentric function.

An eccentric vector 44 is defined for a better description. It has its foot point on the main axis 28. Its tip falls on the eccentric axis 36. It has a direction perpendicular to the two axes 28, 36. Visually speaking, it points to the thickest part of the crescent-shaped gap between the two bearing surfaces 26, 34. The eccentric vector 44 is also suitable for defining a plane of symmetry of the wobble joint fitting. All embodiments shown are symmetric to a plane defined by the eccentric vector 44 and one of the axes 28 and 36, respectively. This symmetry is provided in the clamping state as it is depicted in the Figures. No such symmetry is provided in a drive state.

The eccentric area extends over an angle of at least ±10°, preferably at least ±25° and in particular at least ±30°. In the exemplary embodiment according to FIG. 7, the eccentric area 40 extends over 360°, that is, over the entire extent of the annular eccentric driving part 38.

Finally, the wobble joint fitting comprises a control part 46. Usually, it is not in contact with the clamping parts 42 in the clamping state of the wobble joint fitting. In the driving state, it is directly or indirectly in contact with at least one of the clamping parts 42, namely with the clamping part 42 clamping in the drive direction. A drive 48, which is non-rotatably plugged together with the control part, is allocated to the control part 46. The drive comprises an axle stub reaching into a bore of the first joint arm 20 which is located within the first bearing surface 26.

In the first exemplary embodiment, the eccentric driving part 38 is substantially C-shaped; it extends over about 270°. Diametrically opposite the eccentric area 40 is an air gap between the two bearing surfaces 26, 34; a control lug 46a of the control part 46 reaches into this air gap and effects the driving action in the known manner.

In the first exemplary embodiment, the clamping parts 42 are wedge segments. They are urged into the clamping position by a spring 50 which is configured as an omega spring in the known manner. The two clamping parts 42 are constructionally identical. They extend over about 100°. They rest against the first bearing surface 26 with an inner surface. With an outer surface, they are opposite to an inner wall of an arm 41 of the eccentric driving part 38 and rest against it. The resting contact is preferably line-shaped, parallel to the axes 28, 36. The clamping parts 42 are configured in such a way that the above-described contact and thus the support is effected at an angle of 60°±15° relative to the eccentric vector 44.

Figure 4:
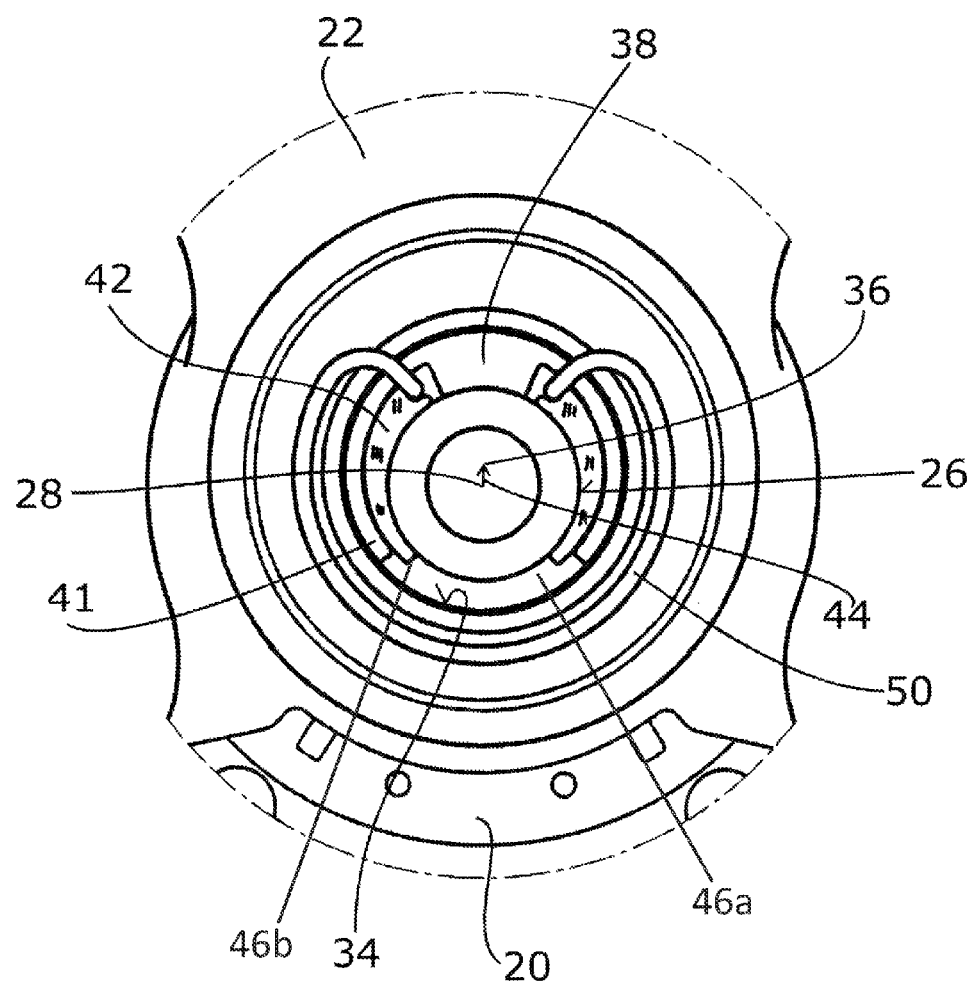
FIG. 4 shows a top view similar to FIG. 3 onto a second exemplary embodiment, which largely matches the first exemplary embodiment.

Starting from the clamping state shown in FIG. 4, a driving process runs as follows: The control part 46 is rotated and, with a flank 46b of its control lug 46a, strikes against a narrow end of the clamping part 42 which lies forward of the flank 46b in the direction of rotation, for example of the clamping part 42 which in FIG. 4 is on the left. This is now moved in the clockwise direction against the force of the spring 50 and, with its wide end, strikes against the eccentric area 40. During the further drive movement, the eccentric driving part 38 is also moved. The two joint arms 20, 22 are thus displaced relative to each other; their angular position is thus changed. When the drive process ends, the spring 50 shifts the clamping parts 42 back into their starting position; this applies at least to the left clamping part 42.

The second exemplary embodiment according to FIG. 4 works like the first exemplary embodiment.

Figure 5:
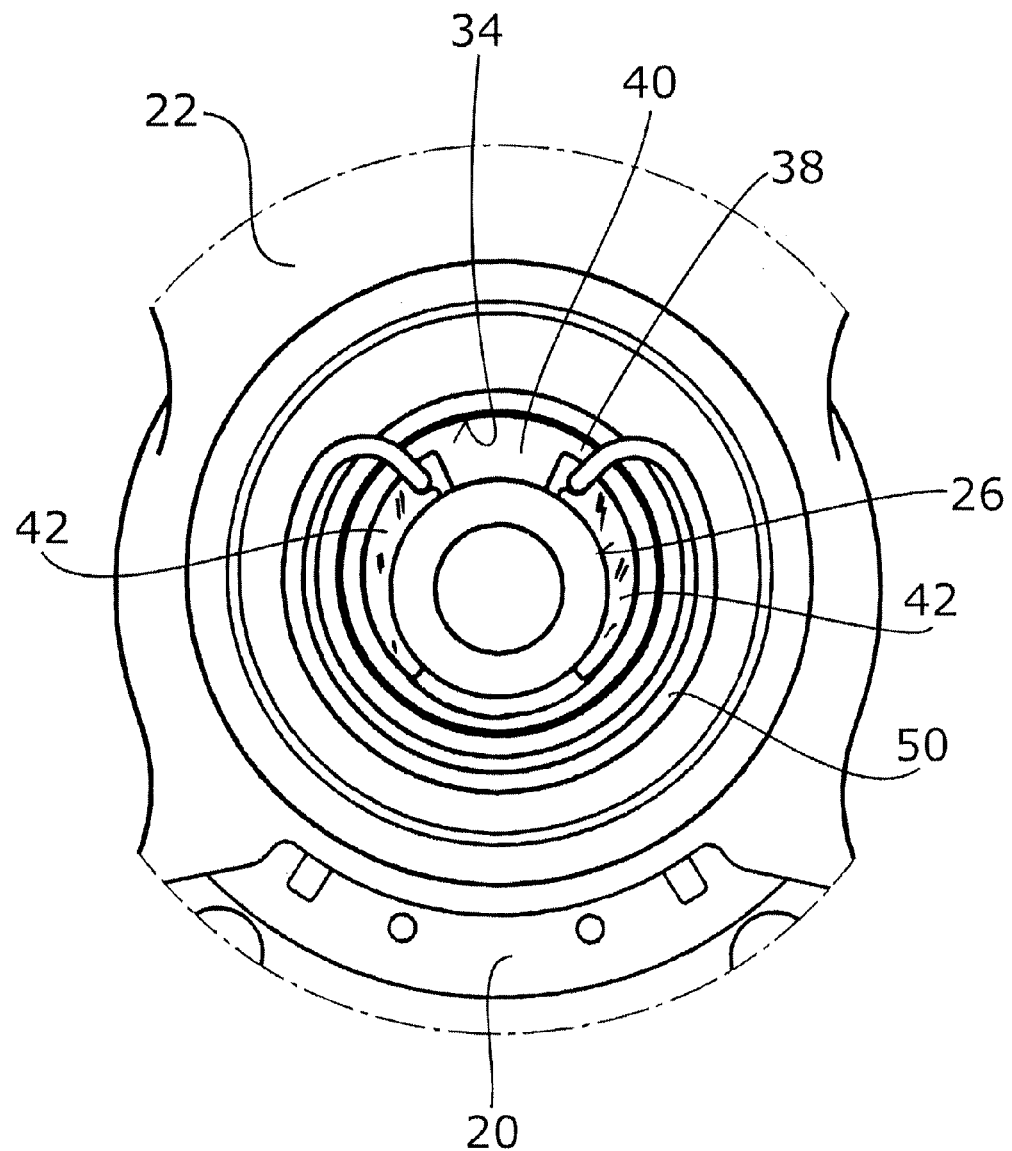
FIG. 5 shows a view like FIG. 4, for a third exemplary embodiment in which the eccentric driving part is a closed ring.

In the third exemplary embodiment according to FIG. 5, the eccentric driving part 38 forms a ring. The clamping parts 42 are still located between the eccentric driving part 38 and the first bearing surface 26. The eccentric driving part 38 is composed of an eccentric area 40 which, as in the first exemplary embodiment, extends over about 45°, and a ring segment extending over the remaining 315° required for a complete revolution. The ring segment is in contact only with the second bearing surface 34; it has a distance from the first bearing surface 26 of at least 1 to 2 mm.

The illustration according to FIG. 5 also applies to a modification in which the eccentric driving part 38 is configured differently to what is described above: It is now configured as a ring extending over 360° and resting against both the first bearing surface 26 as well as the second bearing surface 34 over 360°. Thus, the eccentric area now extends over 360°. The eccentric driving part 38 has a depression or step in which the clamping parts 42 are located. This step extends over about 315°. Steps are now located at those places where, in the above-described exemplary embodiment according to FIG. 5, there were the flanks of the eccentric area 40 extending over 45° that pointed in the circumferential direction. The clamping parts 42 alternately, depending on the direction of rotation, come to rest against these steps during an adjusting movement. Accordingly, the eccentric driving part 38 has two different thicknesses, measured in the axial direction. It has a greater thickness in the area outside of the step. It has a thinner thickness in the area of the step, that is, in particular underneath the clamping parts 42 and between the narrow sides of the clamping parts 42.

Figure 6:
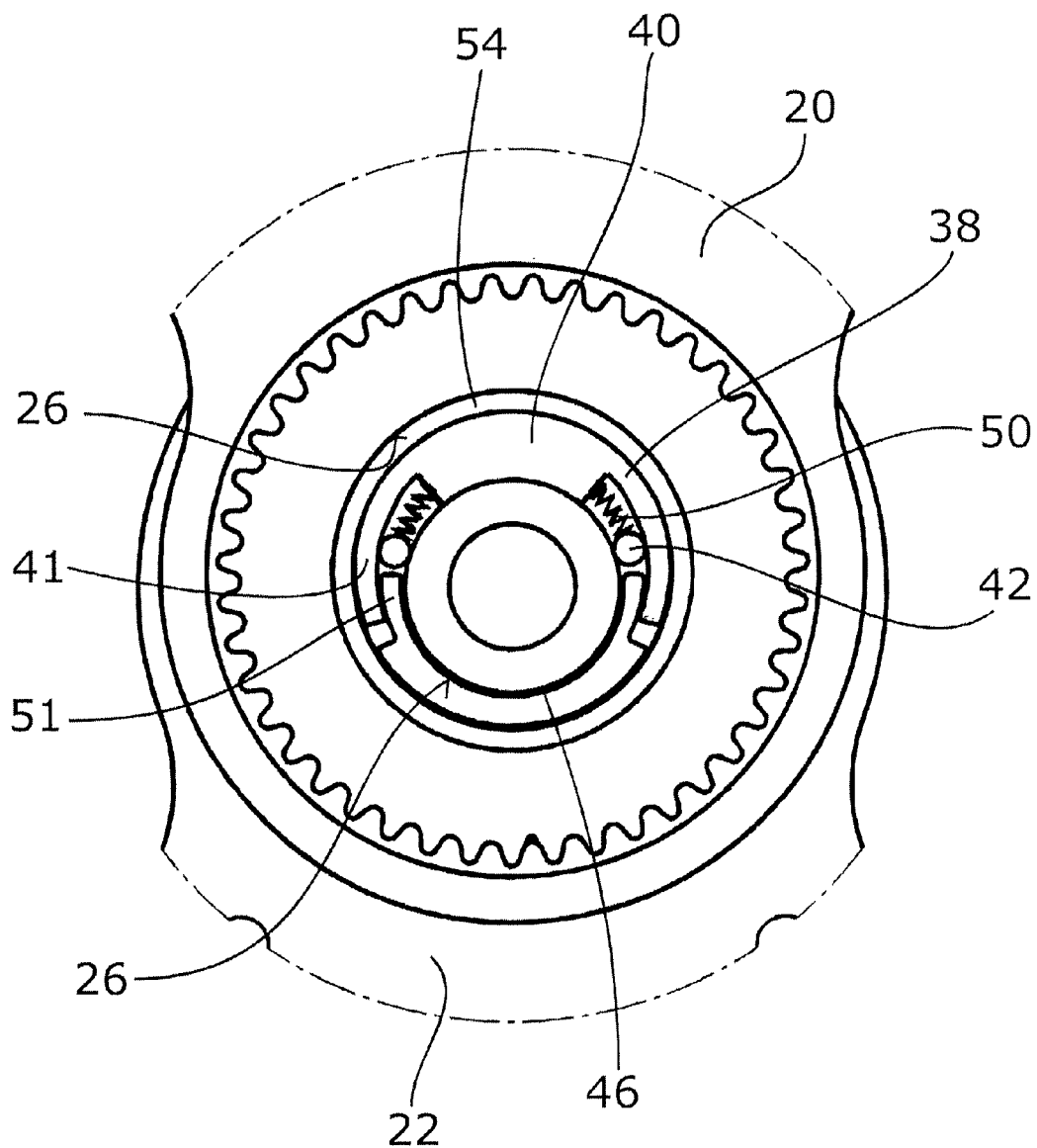
FIG. 6 shows a view similar to FIG. 4, for a fourth exemplary embodiment in which the clamping bodies are configured as rolling bodies.

In the fourth exemplary embodiment according to FIG. 6, the clamping parts 42 are configured as balls or rolling bodies. Now, they are not biased into the clamping position by an omega spring, but by a respectively allocated helical spring. As in the first exemplary embodiment, the eccentric driving part 38 is composed of an eccentric area 40, which now, however, extends over almost 90°, and two arms 41 which also extend over 90° and rest only against the second bearing surface 34. At their inner surfaces, one inclined clamping surface, respectively, is provided for the ball-shaped clamping parts 42. The inclined clamping surface tapers towards an expanding helical spring. The balls forming the clamping parts 42 lie between the arms 41 and the first bearing surface 26. The control part substantially fills the rest of the gap between the bearing surfaces 26, 34 and, with adjusting fingers, reaches into the vicinity of the balls forming the clamping parts 42. Furthermore, the control part 46 comprises a recess that can come into contact with the free ends of the arms 41 of the eccentric driving part 38. In the case of a rotary movement of the control part 46, the finger 51 lying forward in the direction of the direction of movement first presses the adjacent ball out of the clamping position, then, the eccentric driving part 38 is co-rotated. Accordingly the distance between the finger 51 and the ball 42 is smaller than the distance between the recess and the free end of one of the arms 41.

It becomes clear, in particular when referring to the exemplary embodiment according to FIG. 6, that any clamping parts can be inserted.

Figure 7:
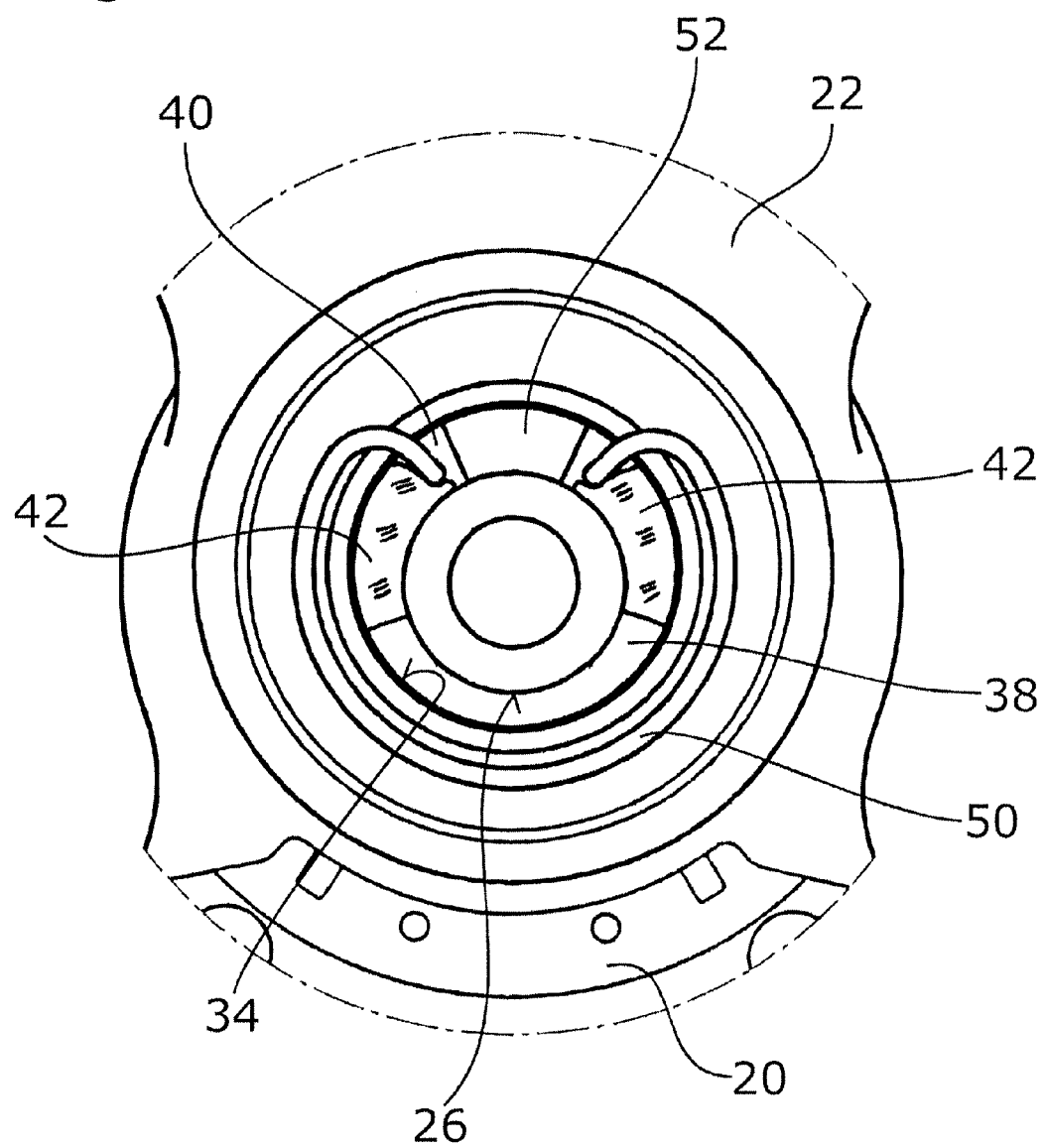
FIG. 7 shows a view like FIG. 4 for a fifth embodiment; in this case, the clamping bodies are now disposed between the first bearing surface and the second bearing surface, the eccentric driving part is configured as a ring and has a step.

Finally, the embodiment according to FIG. 7, that is, the fifth exemplary embodiment, will be discussed. In this case, the wedge-shaped clamping parts 42 are now again arranged in a different plane from the eccentric driving part 38. The eccentric driving part 38 is a closed ring located underneath the clamping parts 42. Thus, the eccentric area 40 extends over 360°. The eccentric driving part 38 comprises a tappet 52 which protrudes into the plane of the clamping parts 42 and is located at the position of the eccentric area 40 of the first exemplary embodiment. It has the same entraining function as the latter. The control part 46 is not shown; it is configured similar to the first exemplary embodiment but extends over a larger angle range so that it can interact with the narrow sides of the clamping parts 42. The clamping parts 42 extend over a smaller angle, for example about 60°, and are thus shorter than in the first exemplary embodiment. The clamping parts 42 rest against both the first bearing surface 26 as well as the second bearing surface 34. They thus act immediately between these two bearing surfaces 26, 34 without the collaboration of the eccentric driving part 38. A slide ring 54 is provided in the known manner, which is inserted into the first bearing surface 26 and takes over its function.

It may be readily understood by those having skill in the pertinent art from the present disclosure that any of numerous changes and modifications may be made to the above-described and other embodiments of the present invention without departing from the scope of the invention as defined in the appended claims.

What is claimed is:

1. A wobble joint fitting for a vehicle seat comprising:
   a main axis;
   a first joint arm, the first joint arm being configured and arranged to carry an internal gear and form a first bearing surface defining an outer surface, the internal gear and the first bearing surface being arranged central to the main axis;
   an eccentric gear defining an eccentric axis;
   a second joint arm, the eccentric gear being allocated to the second joint arm, the second joint arm comprising a) an externally toothed pinion located within the internal gear and in engagement with the internal gear, and b) a second bearing surface defining an inner surface, wherein the pinion and the second bearing surface are central to the eccentric axis;
   an annular eccentric driving part disposed in the area between the first bearing surface and the second bearing surface, wherein the eccentric driving part defines an eccentric and comprises an eccentric area contacting the first bearing surface and the second bearing surface with a fabrication-related play;
   a control part having a control lug with a flank, wherein the eccentric driving part is arranged in driving connection with the control part;
   clamping parts that each have a narrow end and a wide end and contact the first bearing surface and the eccentric driving part, the clamping parts displacing, in a clamping state, the eccentric axis relative to the main axis whereby the wobble joint fitting is made free from backlash; wherein, when the control part is rotated, the flank contacts against the narrow end of one of the clamping parts and moves said clamping part until said clamping part contacts against the eccentric area so that, during further drive movement, the eccentric area is also moved thereby and
   a rotary drive of the eccentric driving part, the rotary drive rotating the pinion relative to the internal gear, the rotary drive even being in a driving connection with the pinion in case the clamping parts are not present in the wobble joint fitting, wherein there is no compensation of backlash when the clamping parts are not present in the wobble joint fitting.

2. The wobble joint fitting according to claim 1, further comprising an eccentric vector including a foot point lying on the main axis, a tip pointing towards the eccentric axis and a direction perpendicular to the main axis, and further comprising an eccentric area located at an angle range of at least 10° and -10° relative to the eccentric vector.

3. The wobble joint fitting according to claim 1, wherein a first clamping part effects a support at an angle of 60° +/−15° , and a second clamping part effects a support at an angle of 60° +/−15° , in each case relative to an eccentric vector including a foot point lying on the main axis, a tip pointing towards the eccentric axis and a direction perpendicular to the main axis.

4. The wobble joint fitting according to claim 1, wherein an eccentric vector a) has a foot point lying on the main axis; b) has a tip pointing towards the eccentric axis and c) has a direction perpendicular to the main axis, and the eccentric area is located at an angle range of at least +−25° relative to the eccentric vector.

5. The wobble joint fitting according to claim 1, further comprising an eccentric vector including a foot point lying on the main axis, a tip pointing towards the eccentric axis and a direction perpendicular to the main axis, and further comprising an eccentric area located at an angle range of at least 30° and −30° relative to the eccentric vector.

6. The wobble joint fitting according to claim 1, further comprising an eccentric vector including a foot point lying on the main axis, a tip pointing towards the eccentric axis and a direction perpendicular to the main axis, wherein the eccentric area is located in the vicinity of the eccentric vector.

7. The wobble joint fitting according to claim 1, wherein between the first bearing surface and the second bearing surface there is a gap, the gap being crescent shaped and has a thickest part, the eccentric area is located in the thickest part.

8. The wobble joint fitting according to claim 1, wherein the clamping parts do not belong to the eccentric driving part and, if the clamping parts are taken out of the fitting, the eccentric driving part can still drive the eccentric gear of the thus modified fitting.

9. The wobble joint fitting according to claim 1, wherein the clamping parts do not belong to the eccentric driving part and do not participate in an eccentric driving action.

* * * * *